US011288406B1

(12) United States Patent
Tran et al.

(10) Patent No.: US 11,288,406 B1
(45) Date of Patent: Mar. 29, 2022

(54) FAST XOR INTERFACE WITH PROCESSOR AND MEMORY

(71) Applicant: The Charles Stark Draper Laboratory, Inc., Cambridge, MA (US)

(72) Inventors: Nhut Tran, Natick, MA (US); J. Ryan Prince, Stow, MA (US); Brian Nugent, Acton, MA (US); Elliot Greenwald, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 201 days.

(21) Appl. No.: 16/685,678

(22) Filed: Nov. 15, 2019

(51) Int. Cl.
*G06F 21/00* (2013.01)
*G06F 21/79* (2013.01)
*G06F 9/455* (2018.01)
*G06F 21/82* (2013.01)
*G06F 21/60* (2013.01)

(52) U.S. Cl.
CPC .......... *G06F 21/79* (2013.01); *G06F 9/45508* (2013.01); *G06F 21/602* (2013.01); *G06F 21/82* (2013.01)

(58) Field of Classification Search
CPC .......... G06F 21/72; G06F 21/79; G06F 21/82; G06F 21/602; G06F 9/45508
See application file for complete search history.

(56) References Cited

U.S. PATENT DOCUMENTS

| 6,970,446 | B2 | 11/2005 | Krischer et al. | |
|---|---|---|---|---|
| 7,188,282 | B2* | 3/2007 | Walmsley | B41J 2/04505 714/718 |
| 7,278,034 | B2* | 10/2007 | Shipton | B41J 2/04505 713/300 |
| 7,660,998 | B2* | 2/2010 | Walmsley | B41J 2/04528 713/189 |
| 7,707,621 | B2* | 4/2010 | Walmsley | H04N 1/405 726/2 |
| 10,705,842 | B2* | 7/2020 | Suresh | G06F 9/30145 |
| 2016/0364343 | A1 | 12/2016 | Case et al. | |

OTHER PUBLICATIONS

Tayenjam, "eMMC and UFS Inline Ecryption in Android-Based Movile Applications," Designware IP Technical Bulletin, 9 pages, Aug. 28, 2019.
Tangirala, "Inline Ecryption Support," Linux Plumbers Conference 2019, 1 page, Sep. 9, 2019.
Micron Technology, Inc., "Automotive DDR4 SDRAM," 384 pages, 2016.

* cited by examiner

*Primary Examiner* — Hosuk Song
(74) *Attorney, Agent, or Firm* — Sunstein LLP

(57) ABSTRACT

An embodiment is directed to a hardware circuit for performing operations on data transmitted between a processor and memory. The hardware circuit includes a first interface communicatively coupled to the processor. The first interface configured to emulate a first protocol of the memory. The hardware circuit further includes a second interface communicatively coupled to the memory. The second interface configured to emulates a second protocol of the processor. The hardware circuit also includes hardware logic configured with a bi-directional path, such that each of the first and second interfaces is associated with a different direction of the bi-directional path. The bi-directional path is configured to execute an operation on data received at both the first interface and the second interface.

46 Claims, 10 Drawing Sheets

FAST XOR INTERFACE WITH PROCESSOR AND MEMORY

STATEMENT REGARDING FEDERALLY SPONSORED RESEARCH OR DEVELOPMENT

This invention was made with Government support under Contract Number N00030-14-G-0050 awarded by the DoD. The U.S. Government has certain rights in the invention.

TECHNICAL FIELD

The present invention relates to hardware circuits, and more particularly to hardware circuits that performs XOR operations on data transmitted between a processor and memory.

BACKGROUND ART

A computer system typically contains a central processing unit (CPU) and associated memory. The execution of an application by a computer system includes the CPU transmitting operations (e.g., read and write operations) to the associated memory. During these operations, an attacker may attempt to hack the application by accessing and modifying data associated with these operations. Typically, securing these operations against attackers involves intervention by the CPU, such as the CPU executing software that generates and/or applies a cipher key to encrypt/decrypt the data. In some configurations, the encryption/decryption software may be assisted by inline encryption hardware coupled to the memory.

The encryption/decryption software executed by the CPU must share the limited processing resources of the CPU with other processes, which may cause slow CPU throughput and added latency to these operations. As such, the operations cannot be performed at the speed of recent types of memory, such as Double Data Rate 4 Synchronous Dynamic Random-Access Memory (DDR4-SDRAM). Further, the security of the encryption/decryption software is affected by the other CPU processes, such that an exploitation of one of the other CPU processes may allow an attacker to compromise the encryption/decryption software.

SUMMARY OF THE EMBODIMENTS

A first embodiment of the present invention is directed to a computer system for performing operations on data transmitted between a processor and memory. The computer system includes the processor and the memory configured to store data associated with the processor. The system also includes an XOR circuit having a first interface configured to emulate a first protocol of the memory and a second interface configured to emulate a second protocol of the processor. The XOR circuit has a bi-directional path, such that each of the first interface and the second interface is associated with a different direction of the bi-directional path. The bi-directional path is configured to execute an operation on data received at both the first interface and the second interface.

In some embodiments, one direction of the bi-directional path has logic configured to receive, at the first interface, data transmitted from the processor to the memory according to the first protocol of the memory. In these embodiments, the one direction is also configured to execute the operation on the data, and transmit the data, in the first protocol, to the memory. In some embodiments, the operation encrypts the data by performing an XOR of the data with a cipher stream. In some embodiments, one direction of the bi-directional path has logic configured to receive, at the second interface, data transmitted from the memory to the processor, the data formed according to the second protocol of the processor. In these embodiments, the one direction is also configured to execute the operation on the data and transmit the data, in the second protocol, to the processor. In some embodiments, the operation is decryption of the data by performing an XOR of the data with a cipher stream.

In some embodiments, the memory is associated with a data transmission speed, and the XOR circuit executes the operation on the data transmitted in either direction of the bi-directional path, without adding latency to the data transmission speed of the memory. In some embodiments, the XOR circuit is configured to execute the operation on the data within a given clock time that enables the XOR circuit to transmit the data without adding latency to the data transmission speed. In some embodiments, the memory is a double data rate 4 (DDR4) DRAM with a high bandwidth DDR4 interface, and the XOR circuit is configured to execute the operation on the data within the given clock time, such that the XOR circuit transmits the data at the data transmission speed of the DDR4 interface. In some embodiments, transmitting the data without adding latency to the data transmission speed is achieved when neither (i) clock speed is reduced, nor (ii) additional clocks are added.

A second embodiment of the present invention is directed to a hardware circuit for performing operations on data transmitted between a processor and memory. The hardware circuit includes a first interface communicatively coupled to the processor. The first interface configured to emulate a first protocol of the memory. The hardware circuit further includes a second interface communicatively coupled to the memory. The second interface configured to emulates a second protocol of the processor. The hardware circuit also includes hardware logic configured with a bi-directional path, such that each of the first and second interfaces is associated with a different direction of the bi-directional path. The bi-directional path is configured to execute an operation on data received at both the first interface and the second interface.

In some embodiments, in one direction of the bi-directional path, the hardware logic is configured to receive, at the first interface, data transmitted from the processor to the memory according to the first protocol of the memory. In these embodiments, in the one direction, the hardware logic is also configured to execute the operation on the data, and transmit the data, in the first protocol, to the memory. In some embodiments, the operation encrypts the data by performing an XOR of the data with a cipher stream. In some embodiments, in one direction of the bi-directional path, the hardware logic is configured to receive, at the second interface, data transmitted from the memory to the processor, the data formed according to the second protocol of the processor. In these embodiments, in the one direction, the hardware logic is also configured to execute the operation on the data and transmit the data, in the second protocol, to the processor. In some embodiments, the operation decrypts the data by performing an XOR of the data with a cipher stream.

In some embodiments, the memory is associated with a data transmission speed, and the hardware logic executes the operation on the data transmitted in either direction of the bi-directional path, without adding latency to the data transmission speed of the memory. In some embodiments, the hardware logic is configured to execute the operation on the data within a given clock time that enables the XOR circuit to transmit the data without adding latency to the data transmission speed. In some embodiments, the memory is a double data rate 4 (DDR4) DRAM with a high bandwidth DDR4 interface, and the XOR circuit is configured to execute the operation on the data within the given clock time, such that the XOR circuit transmits the data at the data transmission speed of the DDR4 interface. In some embodiments, transmitting the data without adding latency to the data transmission speed is achieved when neither (i) clock speed is reduced, nor (ii) additional clocks are added.

A third embodiment of the present invention is directed to a method of performing operations on data transmitted between a processor and memory. The method includes receiving a first set of data at a first interface of a XOR circuit. The first interface configured to emulate a first protocol of a memory. The method further includes receiving a second set of data at a second interface of the XOR circuit. The second interface configured to emulate a second protocol of the processor. The method also includes executing, by hardware logic having a bi-directional path, an operation on the first set of data and the second set of data. Each of the first interface and the second interface is associated with a different direction of the bi-directional path.

In some embodiments, the operation is executed by the hardware logic in the different directions of the bi-directional path, without adding latency to the data transmission speed.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "set" includes at least one member.

Figure 1:
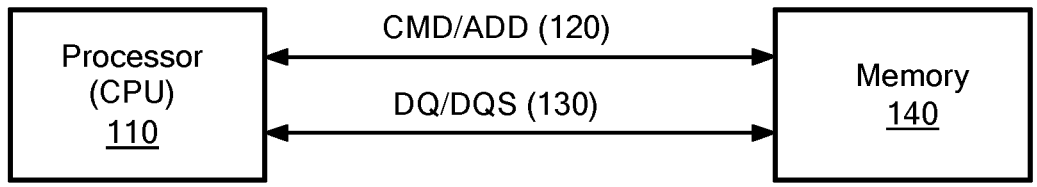
FIG. 1 illustrates a common interface between a processor and memory in a computer system.

FIG. 1 illustrates a common interface between a processor and memory in a computer system. The processor 110 may be a CPU memory controller. As shown in FIG. 1, a processor 110 is commonly coupled to memory 140 via buses, including a command and address (CMD/ADD) bus 120 and a DQ/DQS bus 130. The DQ/DQS bus 130 includes data signal (DQ) lines and corresponding data strobe clock signal (DQS) lines. In some embodiments, the memory 140 is a dual in-line memory module (DIMM) Double Data Rate (DDR) Synchronous Dynamic Random-Access Memory (SDRAM). In these embodiments, the memory 140 may be DDR1 SDRAM, DDR2 SDRAM, DDR3 SDRAM, DDR4 SDRAM, or such. Each of these memories is associated with a pre-defined transmission speed. For example, see timing and transmission speeds for the DDR4 SDRAM in the Micron Automotive DDR4 SDRAM MT40A512M8 and MT40A256M16 Specifications, Micron Technology, Inc., CCMTD-1725822587-10418, 4 gb_auto_ddr4_sdram_z90b_z10B.pdf-Rev. I 05/19 EN (2016), incorporated herein, in its entirety, by reference. In an example embodiment, the processor 110 is an Intel Xeon processor.

The processor 110 uses these buses 120, 130 to perform an operation on the memory 140, such as reading from the memory 140, writing to the memory 140, etc. In particular, the processor 110 uses the CMD/ADD bus 120 to transmit to the memory: (i) a command signal (e.g., read command, write command, etc.) corresponding to the operation and (ii) the physical address in the memory 140 to access with respect to the operation.

In an example protocol between the processor 110 and memory 140 (such as the DDR 4 protocol), the processor 110 uses the CMD/ADD bus 120 to transmit various types of command signals to the memory 140. The command signals may include commands to calibrate the memory 140, such as Mode Register Set (MRS) and ZQ Calibration. The command signals may also include a set of commands to read or write to the memory 140. To perform a read or write, the processor 110 may first access a specific memory bank in which to read or write. To do so, the processor first sends a Bank/Row Activation (ACT) command to active a row in that bank of the memory 140. The processor 110 may next send the Read (RD) or Write (WR) command to perform the actual read from or write to that memory bank. The processor 110 may then send a Pre-charge (PRE), Pre-charge All (PREA), Write Auto Pre-charge (WRA), or Read to Pre-charge (RDA) command to close the currently activated memory bank before activating a different row in the bank.

The processor 110 and the memory 140 use the DQ/DQS bus 130 to send a data signal associated with the command and a corresponding data strobe signal. For example, when the processor 110 writes data to the memory 140, the processor 110 transmits, via the CMD/ADD bus 120, the write command signal and a write address in the memory 140. The processor 110 further transmits, via the DQ/DQS bus 130, a signal of the data to be written to the address and a corresponding data strobe clock signal. After receiving the write command signal and data signal, the memory 140 stores the data at the write address. As another example, when the processor 110 reads data residing in the memory 140, the processor 110 transmits, via the CMD/ADD bus 120, the read signal and the address of the data to be read. After receiving the read command signal, the memory 140 reads the data from the specified address. The memory 140 then transmits, via the DQ/DQS, a signal of the read data and a corresponding data strobe clock signal to the processor 110.

Figure 2:
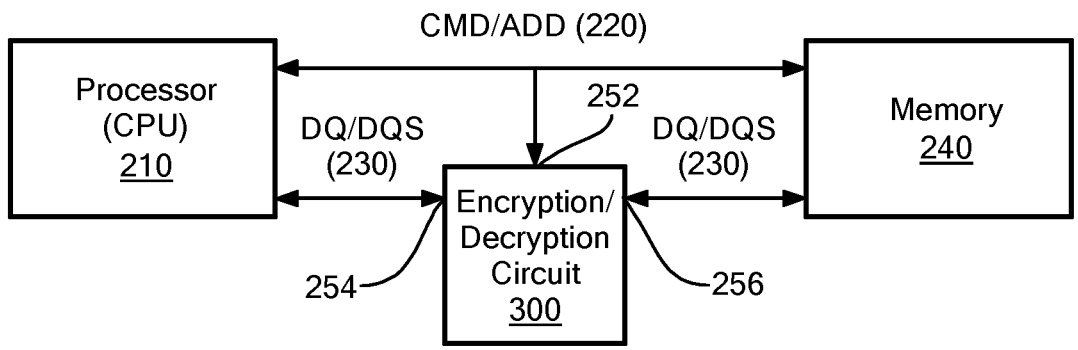
FIG. 2 illustrates a computer system for encrypting/decrypting data transmitted between a processor and memory in accordance with an embodiment of the present invention.

FIG. 2 illustrates a computer system for encrypting/decrypting data transmitted between a processor and memory in accordance with an embodiment of the present invention. The embodiment of FIG. 2 includes a modification to the common interface between a processor and memory shown in FIG. 1. The embodiment of FIG. 2 may be used to perform encryption/decryption operations on data transmitted between the processor 210 and memory 240, without intervention by the processor 210. In particular, the computer system of FIG. 2 is configured with an encryption/decryption circuit 300 that is positioned between the processor 210 and the memory 240. The encryption/decryption circuit 300 includes an interface 252 that receives the command signals and associated memory addresses transmitted on the CMD/ADD bus 220 by the processor 210. The encryption/decryption circuit 300 further includes an interface 254 that: (i) receives the data and data strobe signals transmitted on the DQ/DQS bus 230 from the processor 210, and (ii) transmits the circuit modified (decrypted) data and data strobe signals on the DQ/DQS bus 230 to the processor 210. The encryption/decryption circuit 300 also includes interface 256 that: (i) receives the data and data strobe signals transmitted on the DQ/DQS bus 230 from the memory 240, and (ii) transmits the circuit modified (encrypted) data and data strobe signals on the DQ/DQS bus 230 to the memory 240.

In the embodiment of FIG. 2, when powered up, the encryption/decryption circuit 300 generates and stores a cipher key for encrypting/decrypting data signals transmitted between the processor 210 and memory 240. After powering up, the encryption/decryption circuit 300 uses interface 252 to snoop (i.e., receive and analyze) the transmissions on the CMD/ADD bus 220 to determine the interface and operations between the processor 210 and memory 240, such as the command sequence, timing, use of memory registers, etc. For example, the encryption/decryption circuit 300 may snoop the mode register set (MRS) commands transmitted on the MID/ADD bus 220 to determine the setup by the processor 210 of registers in the memory 240, and may snoop the bank/row activation (ACT) commands to determine a bank/row in memory 240 is being activated for reading or writing. The circuit can used this snooped information to calibrate and control the circuit with respect to performing encryption/decryption operations.

By snooping the CMD/ADD bus 220 using interface 252, the encryption/decryption circuit 300 can detect a write command transmitted by the processor 210 to the memory 240. Based on the snooped information, the encryption/decryption circuit 300 can encrypt the data signal associated with the write command as this data signal is transmitted on the DQ/DQS bus 230. For example, the encryption/decryption circuit 300 encrypts the data signal on the DQ/DQS bus 230 in a manner that does not violate the protocol of the memory 240 (e.g., DDR 4 protocol). Based on the snooped information, the encryption/decryption circuit 300 receives the associated data signal from interface 254 on the DQ/DQS bus 230 and can encrypt the data signal, using the stored cipher key, in a number of clock cycles (e.g., ½ a clock cycle) that avoids adding latency to the transmission speed of the data signal, such that the transmission meets the timing requirements of the memory protocol. In some embodiments, avoiding adding latency to the transmission speed is achieved in the system when neither (i) clock speed is reduced, nor (ii) additional clocks are added. Using interface 256, the encryption/decryption circuit 300 accordingly transmits the encrypted data signal on the DQ/DQS bus 230 to the memory 240.

Similarly, by snooping of the CMD/ADD bus 220 using interface 252, the encryption/decryption circuit 300 can detect a read command transmitted by the processor 210 to the memory 240. Based on the snooped information, the encryption/decryption circuit 300 decrypts the associated data signal read from the memory 240 as the data is transmitted on the DQ/DQS bus 230. For example, the encryption/decryption circuit 300 decrypts the data signal on the DQ/DQS bus 230 in a manner that does not violate the protocol of the memory 240 (e.g., DDR 5 protocol). Based on the learned behavior, the encryption/decryption circuit 300 receives the associated data signal from interface 256 on the DQ/DQS bus 230, and can decrypt the data signal with the stored cipher key in a number of clock cycles (e.g., ½ a clock cycle) that avoids adding latency to the transmission speed of the data, such that the transmission meets the timing requirements of the memory protocol. Using interface 254, the encryption/decryption circuit 300 accordingly transmits the decrypted data signal on the DQ/DQS bus 230 to the processor 210.

Figure 3A:
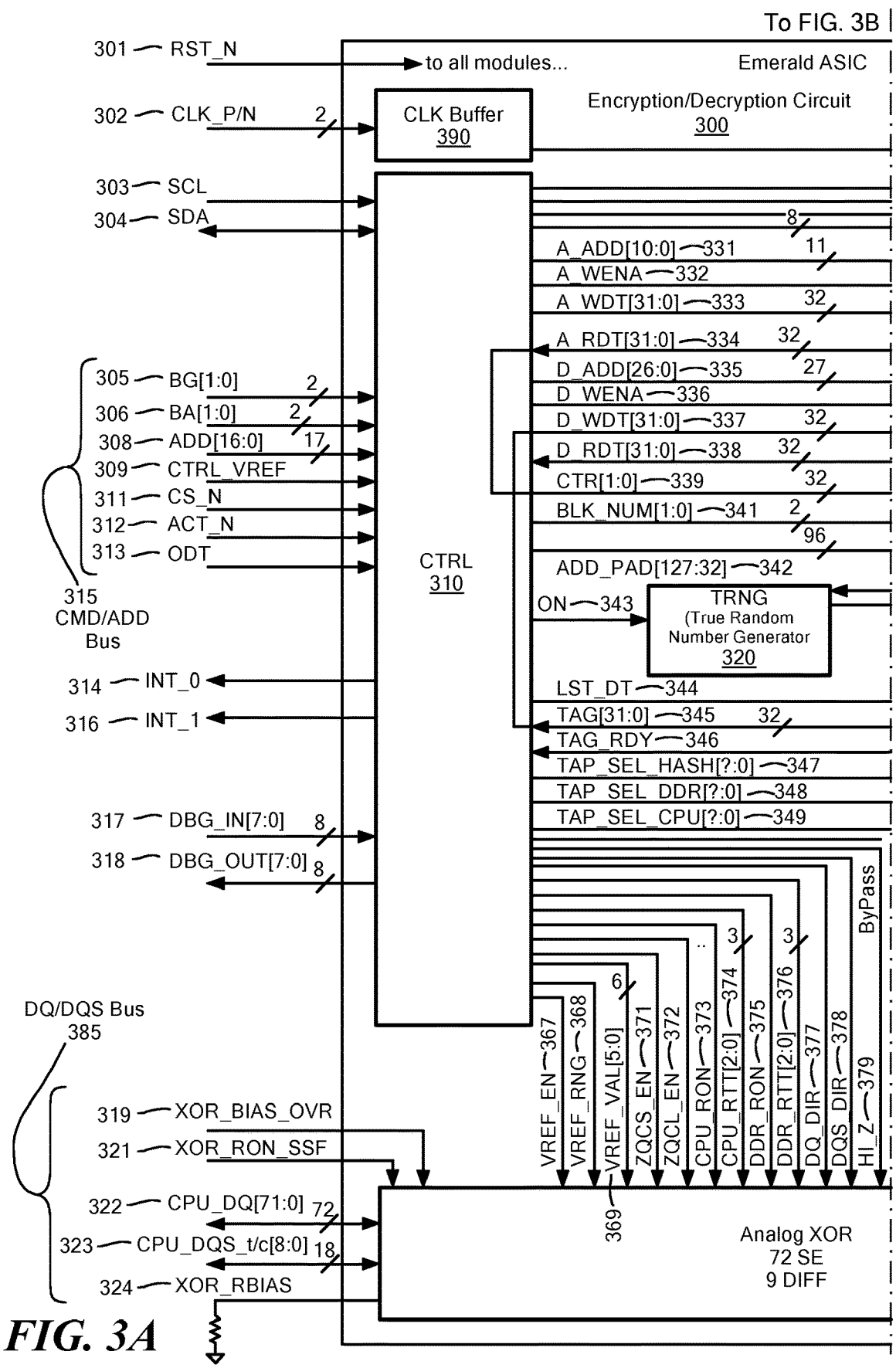
FIGS. 3A and 3B (collectively FIG. 3) illustrate an example embodiment of the encryption/decryption circuit in FIG. 2.
Figure 3B:
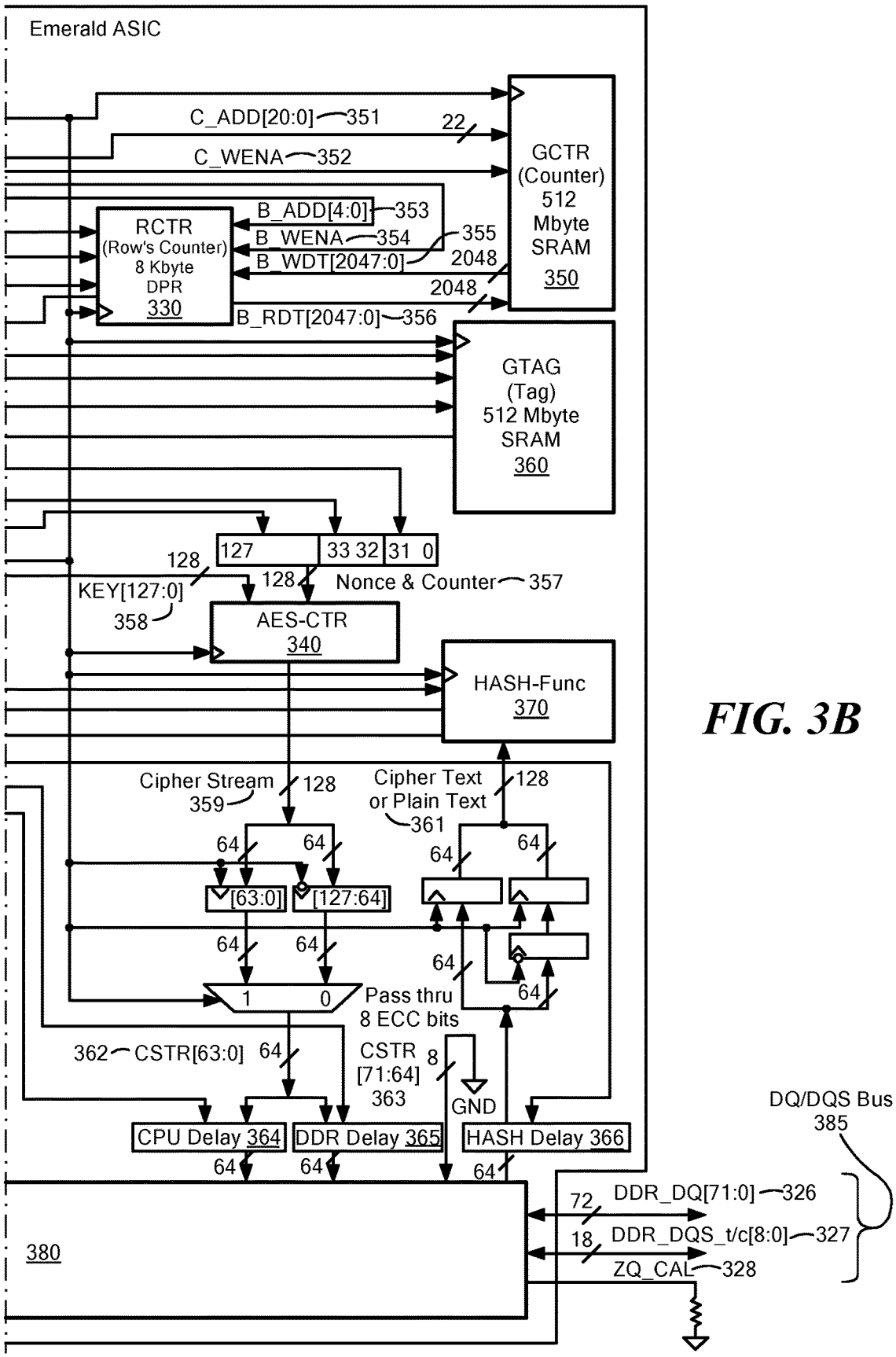

FIG. 3 illustrates an example embodiment of the encryption/decryption circuit in FIG. 2. In some embodiments, the encryption/decryption circuit 300 is an application-specific integrated circuit (ASIC). FIG. 3 describes an embodiment of the encryption/decryption circuit using the block cypher of Advanced Encryption Standard (AES). However, in other embodiments, any other type of block cypher may instead be used in the encryption/decryption circuit.

The encryption/decryption circuit 300 may include eight primary modules as shown in the block diagram of FIG. 3. These modules are the state machine traffic controller (CTRL) module 310, the XOR logic module 380, the Advanced Encryption Standard (AES)-Counter (AES-CTR) module 340, the Hash Function module 370, the global counter memory (GCTR) module 350, the global tag memory (GTAG) module 360, the rows counter memory (RCTR) module 330, and the true random number generator (TRNG) module 320. Note, the AES-CTRL module 340 may be replaced by a counter mode associated with another type of block cypher.

The CTRL module 310 is the core of encryption/decryption circuit 300, and acts as a traffic controller. The CTRL module 310 snoops, on the CMD/ADD bus 315, the various memory commands transmitted between the processor 210 and the memory 240. The commands and associated addresses are specified in the CMD/ADD bus 315 using the following signals: bank group (BG[1:0]) 305, bank address (BA[1:0]) 306, address (ADD[16:0]) 308, Command/Address Reference Voltage (CTRL_VREF) 309, Active low chip select (CS_N) 311, Active low Activation select (ACT_N) 312, and On Die Termination (ODT) 313. Based on the snooped command, the CTRL module 310 executes operations to calibrate and control the circuit 300 to encrypt/decrypt the data signals on the DQ/DQS bus 385 (on-the-fly), without causing latency that would violate the timing of the protocol of the memory 240 (e.g., DDR 4 protocol). For example, the CTRL module 310 may calibrate reference voltage, traffic direction, output drivers (e.g., driver strength), ODT, and such in accordance with the protocol of the memory 240.

The CTRL module 310 is operatively coupled to the GCTR module 350 and RCTR module 330. The GCTR module 350 stores global counters for the memory 240. Each counter is associated with a corresponding cache line in the memory 240. When the CTRL module 310 detects certain pre-defined command (such as PRE, PREA, WRA, and RDA) with respect to a given cache line, the CTRL module 310 asserts C_WENA 352 and C_ADD[20:0] 351 to increment the corresponding counter at the GCTR module 350. C_ADD[20:0] 351 is comprised of bank group 305, bank address 306, and a row address from ADD 308. If a counter reaches its maximum value, the CTRL module 310 asserts the key rolling interrupt (INT_1) 316. Since the GCTR module 350 is slow in accessing the counters (e.g., due to size), the CTRL module 310 does not use these counters directly from the GCTR module 350. Rather, the CTRL module 310 fetches a subset of these counters (e.g., 16 rows) into the RCTR module 330 which provides fast access memory.

The CTRL module 310 fetches such subset as follows. Upon detecting a certain pre-defined command (such as ACT), the CTRL module 310 asserts C_WENA 352 and C_ADD[20:0] 351 to the GCTR module 350 to read a pre-defined number of rows of corresponding counters. Ten clocks after asserting C_WENA 352, the rows are available, and the CTRL module 310 asserts B_WENA 354 and B_ADD[4:0] 353 to write these rows at the RCTR module 330. The rows are written to the RCTR module 330 on B_WDT[2047:0] 355. In some embodiments, the pre-defined number of rows is the number of rows that the processor 210 is configured to activate and access from the memory 240 in a given operation. The GCTR module 350 is configured to allow data to be fetched and an updated counter to be written at the same time.

Upon detecting a certain pre-defined command (such as Write or Read), the CTRL module 310 asserts A_WENA 332 and A_ADD[10:0] 331 to the RCTR module 330 to read the counter corresponding to the command. The counter is read from the RCTR module 330 on A_RDT[31:0] 334. The CTRL module 330 then pads the counter with the command address to create a nonce (e.g., 128-bit nonce). The CTRL module 310 passes the nonce to a cypher module, such as the AES-CTR module 340, via ADD_PAD[127:32] 342, along with the counter (CTR[1:0]) 339 and an identifier of the cache line block (BLK_NUM[1:0]) 341. Note that any block cypher can be converted to a streaming cypher by using that block cypher in a counter mode. AES-CTR module 330 is the counter mode version of AES. In other embodiments, AES-CTR may be replaced by the counter mode of another block cypher. The nonce, counter, and cache line block are formatted together as shown in 357.

The CTRL module 310 is operatively coupled to the TRNG module 320. When the circuit 300 is powered up, the CTRL module 310 asserts an "On" signal 343 to the TRNG module 320 that causes the TRNG module 320 to randomly generate a key. In some embodiments, the key is 128 bits. In some embodiments, the generated key is stored in non-volatile memory (e.g., disk storage) and retrieved from that memory by the CTRL module 310 or TRNG module 320. The CTRL module 310 is further operatively coupled to the AES-CTR module 340. Upon a write or read command, the CTRL module 310 has the AES-CTR module 340 generate a cipher stream 359 that is input to the XOR logic module 380 to encrypt/decrypt data on the DQ/DQS bus 385. In some embodiments, the circuit 300 includes the XOR logic module described later in connection with FIGS. 6-7. AES-CTR module 340 generates the cipher stream 359 from the key generated by the TRNG module 320 and the nonce and counter passed to the AES-CTR module 340 from the CTRL module 310. The generated key from the TRNG module 320 is provided to the AES-CTR module 340 via KEY[127:0] 358. The cipher stream is generated from both the nonce, counter, and key because the use of the key alone would be easier for a malicious actor to hack. The key can change once or more per power-up. For example, if a counter rolls over, the CTR module 340 attempts to avoid repeating a key-counter pair. This can be achieved by (a) power cycling and new key generation on every power up, or (b) changing the key and bookkeeping which key was used.

The CTRL module 310 is also operatively coupled to the XOR logic module 380, which receives inputs from the DQ/DQS bus 385. The inputs from the processor 201 include DQ data (plaintext) 322, DQS data strobe 323, XOR comparator control (XOR_BIAS_OVR) 319, XOR output impedance driver control (XOR_RON_SSF) 321, and XOR current (XOR_RBIAS) 324 from the processor 210. The inputs from the memory 240 also include DQ data (cipher text) 326 and DQS data strobe 327. The XOR logic module 380 also receives as input the signals: on die termination (ODT) calibration (ZQ_CAL) 328, enable reference voltage (Vref) calibration (VREF_EN) 367, Vref range (VREF_RNG) 368, Vref levels (VREF_VAL[5:0]) 369, ZQCS_EN 371, ZQCL_EN 372, processor side output driver impedance value (CPU_RON) 373, processor side ODT value (CPU_RTT[2:0]) 374, memory side output driver impedance value (DDR_RON) 375, memory side ODT value (DDR_RTT[2:0]) 376, data direction (DQ_DIR) 377, data strobe direction (DQS_DIR) 378, high signal (HI_Z) 379, bypass signal (ByPass) 381.

On a write command from the processor 210 to the memory 240, the XOR logic module 380 XORs the DQ data (plaintext) 322 with the cipher stream 359 generated by the AES-CTR module 340 to create encrypted data (cipher text) that is transmitted to the memory 240. The Hash Function module 370 receives 361 either the cipher text or plain text from the XOR logic module 380 and generate a new authentication tag (e.g., 32-bit authentication tag) for the cache line corresponding to the write command. The GTAG module 360 stores the authenticated tags for the memory 240. Each authentication tag is associated with a corresponding cache line in the memory 240. The CTRL module 310 asserts the TAG_RDY signal 346 and the generated authentication tag is placed in the TAG[31:0] signal 345 (the last data of the tag set in LST_DT signal 344) from the Hash Function module 370 to be written or updated in the GTAG module 360. The CTRL module 310 asserts D_WENA 336 and D_ADD[26:0] 335 to write these rows at the GTAG module 360. The rows are written to the GTAG module 360 on D_WDT[31:0] 337.

On a read command from the processor 210 to the memory 240, the XOR logic module 380 XORs the encrypted DQ data 326 (cipher text) received from the memory 240 with the cipher stream 359 to restore the cipher text to plain text. The Hash Function module 370 receives 361 either the cipher text or plain text from the XOR logic module 380 and generates the authentication tag for the cache line corresponding to the read command. The CTRL module 310 asserts the TAG_RDY 346 signal and the authentication tag is placed in the TAG[31:0] 345 signal to the CTRL module 310. The CTRL module 310 also asserts D_WENA 336 and D_ADD[26:0] 335 to read the authentication tag stored at the GTAG module 360 for the cache line of the read command. The CTRL module 310 performs a compare of the authentication tag from the Hash Function module 370 and the stored authentication tag (in GTAG 360). If the tags match, the XOR logic module 380 decrypts the DQ data 326, otherwise, the CTRL module 310 captures the error address and asserts a tag mismatch interrupt (INT_0) 314.

The inputs to the XOR logic module 380 are synchronized, such that the cipher stream 359 arrives at the XOR logic module 380 at same time as the DQ data 322, 326 of the DQ/DQS bus 385. Such synchronization allows the XOR logic module 380 to encrypt/decrypt and output the data in a clock time period (e.g., ½ clock cycles) that does not violate timing of the memory 240 (e.g., DDR4 timing). The timing of the cipher stream 359 from AES-CTR module 340 is relative to the internal clock of the encryption/decryption circuit 300, but the timing of the DQ (plaintext) 322 is relative to the DQS (data strobe) 321 driven from the processor 210 and the timing of the DQ (cipher text) 326 is relative to the DQS (data strobe) 327 driven by the memory 240. After calibration, the DQS 321, 327 has a fixed timing relative to external clock of the memory 240 so the DQ (plaintext) 322 and DQ (cipher text) 326 should each have a fixed timing relative to this external clock. Because DQ (plaintext) 322 and DQ (cipher text) 326 are driven different drivers, their timing relative to this external clock is different. Therefore, two separate delay values, CPU Delay 364 and DDR Delay 365, are applied to synchronize the cipher stream 359 to the DQ (plaintext) 322 or DQ (cipher text) 326. The delays may be calibrated based on calibration commands snooped by the CTRL module 310 on the CMD/ADD bus 315. To perform this synchronization, the CPU Delay 364 is input a tap delay number (TAP_SEL_CPU 349) and DDR Delay 365 is input a tap delay number (TALP_SEL_DDR 348).

Further, the use of the faster access memory of RCTR module 330 to retrieve the counter for generation of the cipher stream 359 facilitates the synchronization of the cipher stream 359 to the DQ (plaintext) 322 or DQ (cipher text) 326 at a speed that affords the XOR logic module 380 sufficient clock time (e.g., ½ clock cycle) to encrypt/decrypt and output the DQ data 322, 326 without violating the memory protocol.

A delay value, HASH Delay 366, is also applied to synchronize receiving the DQ (plaintext) 322 and DQ (cipher text) 326 from the XOR logic module 380 for generating authentication tags. To perform this synchronization, the HASH Delay 366 is input a tap delay number (TAP_SEL_HASH 347). The embodiment of the encryption/decryption circuit in FIG. 3 also includes the following signals active low reset (RST_N) 301, differential clock (CLK_P/N) 302, input debug signals (DBG_IN[7:0]) 317, and output debug signals (DBG_OUT[7:0]) 318.

Figure 4A:
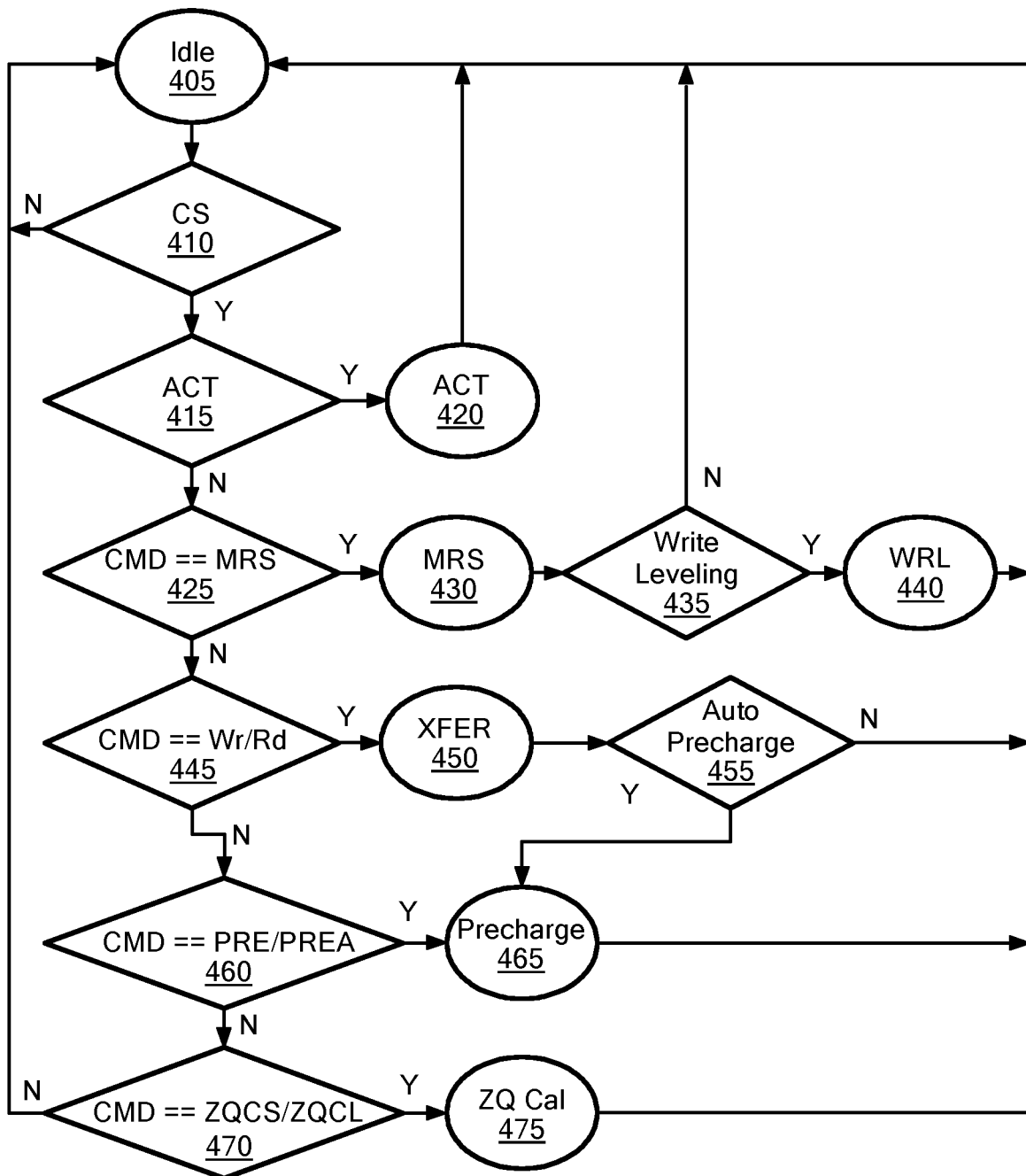
FIGS. 4A and 4B illustrate state machines used by an encryption/decryption circuit to determine current operations between a processor and memory in accordance with an embodiment of the present invention.
Figure 4B:
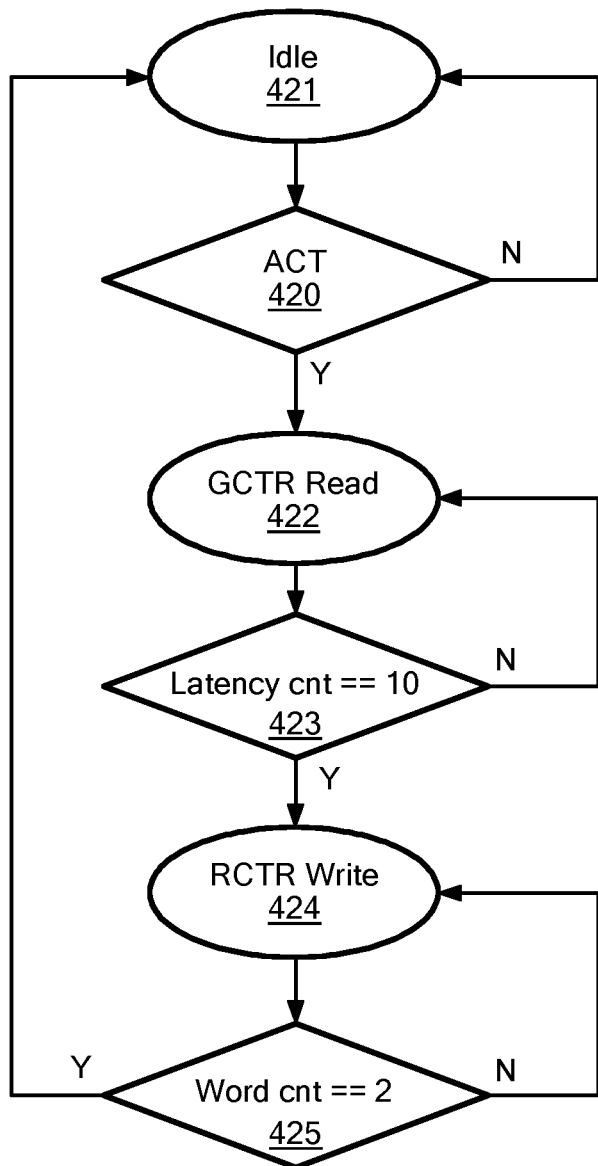

FIGS. 4A and 4B illustrate state machines that may be used by an encryption/decryption circuit to determine current operations between a processor and memory in accordance with an embodiment of the present invention.

FIG. 4A shows an example state machine used by the CTRL module 310 of FIG. 3 that may be used to calibrate and control the circuit to perform encrypt/decrypt operations based on commands transmitted between a processor and memory.

The state machine of FIG. 4A processes determines the state of the encryption/decryption circuit based on these command. The state machine starts in the idle state 405 and detects a command signal 410. If the command signal is a Bank/Row Activation (ACT) signal 415, the state machine enters the ACT state 420. In this state, the CTRL module 310 reads (prefetch) a certain number of rows of counters (e.g., 1 row) from the GCTR module 350 and write them into the RCTR module 330. In some embodiments, a row has 128 32-bit counters, so a total of 128*32=4096 bits need to be transferred from the GCTR module 350 to the RCTR module 330 per row. Bus width (of B_WDT) between the GCTR module 350 and the RCTR module 330 is 2048, so two reads occur to pre-fetch each row. The processing of the ACT command is provided in more detail in connection with FIG. 4B.

If the command signal is a Mode Register Set (MRS) signal 425, the state machine enters the MRS state 430. After power on, the processor 210 uses the different MRS signals to calibrate and initialize the memory 240 before starting any data transfer. In this state, the CTRL module 310 calibrates the circuit based on the different MRS signals. For example, for MRS0, the CTRL module 310 may determine the delay (read latency) in clock cycles from the processor's assertion of read command to the first data returned by the memory 240 and calibrate the XOR logic module 380 based on this delay. For another example, for MRS1, the CTRL module 310 may determine and calibrate write leveling, a nominal on die termination (ODT) value, output driver impedance value, and additive latency. For a further example, for MRS2, the CTRL module 310 may determine and calibrate the delay (write latency) in clock cycles from the processor's assertion of read command to the processor's first data out to memory 240.

If the MRS signal indicates that write leveling 435 is enabled, the state machine enters the Write Leveling (WR) state 440. The processor 210 enables write leveling in the memory 240 to compensate DQS to the clock skew. When enabled, the processor 210 drives the DQS data strobes signals and receives the DQ data signals. The CTRL module 310 asserts the DQ_DIR 377 and DQS_DIR 378 to calibrate the XOR logic module 380 accordingly.

If the command signal is a Write (WR) signal or Read (RD) signal 445, the state machine enters the XFER state 450. For a write transfer, the CTRL module 310 controls that the cipher stream so that it is available at the same time as the plaintext DQ Data 322, and the XOR logic module is configured to XOR the cipher stream with the plaintext to produce and output the cipher text at a speed that does not cause latency that would violate the memory protocol timing requirements. In embodiments, the cipher stream and plaintext DQ Data 322 should be provided to the XOR logic module, such that the clock time to encrypt and output the DQ Data 322 is less than or equal to the set CWL value of the processor 210. During the ACT state, prior to the XFER state 450, the counter rows were already copied from the GCTR module 350 to the faster access RCTR module. The CTRL module control when to read the counter from the RCTR module to generate the cipher stream so that the cipher stream is available at the same time as the DQ Data 322. The CTRL module 310 also control when to generate the authentication tag, such that the XOR logic module can encrypt the plaintext and output the cipher text at a speed that does not cause such latency.

For a read transfer, the CTRL module 310 similarly controls that the cipher stream so that it is available at the same time as the cipher text DQ Data 326, and the XOR logic module is configured to XOR the cipher stream with the cipher text to produce and output the plain text at a speed that does not cause latency that would violate the memory protocol timing requirements. In embodiments, the cipher stream and cipher text DQ Data 326 should be provided to the XOR logic module, such that the clock time to decrypt and output the DQ Data 322 is less than or equal to the set CWL value of the processor 210. During the ACT state, prior to the XFER state 450, the counter rows were already copied from the GCTR module 350 to the faster access RCTR module 330. The CTRL module 310 controls when to read the counter from the RCTR module 330 to generate the cipher stream so that the cipher stream is available at the same time as the DQ Data 326. The CTRL module 310 also controls when to generate the authentication tag, read the stored authentication tag, and compare the two tags, such that the XOR logic module can decrypt the cipher text and output the plaintext at such a speed that does not cause such latency.

From the XFER state, an Auto Precharge command 455 is automatically asserted and the state machine enters the Precharge state 465. This state may also be entered by detecting a Pre-charge or Pre-charge 460 all command. These commands are used by the processor to deactivate the open row of cache lines in a particular bank or the open row in all banks. In this state, the CTRL module 310 evicts all counters in the RCTRL module back to the GCTR module and writes an incremented counter to the GCTR module 350 for the cache line corresponding to the command.

If the command signal is ZQCS or ZQXL signal 470, the state machine enters the ZQ Cal state 475. The processor 210 initiate these command signals to enable the memory 240 to calibrate its internal ODT (CPU_RTT and DDR_RTT) and Output driver (CPU_$R_{ON}$ and DDR_$R_{ON}$ logic using an external precision resistors associated with the processor 210 and memory 240. When in this state, the CTRL module 310 calibrates the XOR logic module accordingly by asserting the ZQCS_EN or ZQCL_EN signal.

FIG. 4B shows an example state machine that may be used by the CTRL module 310 of FIG. 3 in response to an ACT command 420. The state machine starts in the idle state 421 and detects the ACT command signal 420. The state machine then enters the GCTR read state 422 and the CTRL module 310 reads (prefetches) a row worth of counters from the GCTR module 350. In this embodiment, the CTRL module 310 checks 423 if the row is available on the write bus 10 clock cycles later. If not, the CTRL module 310 repeats the read (prefetch) from the GCTR module 350. The state machine then enters the RCTR write state 424 and the CTRL module 310 writes the pre-fetched row to the RCTR module 330 that has faster access. In this embodiment, the CTRL module 310 checks 425 the written word count. If this word count is not equal to two, the CTRL module 310 repeats the write to the RCTR module. By writing the row to the RCTR module 330, the row can be accessed faster during a read/write command to generate a cipher stream to encrypt/decrypt the associated data (thereby allowing the circuit to perform the encryption/decryption without adding latency to the transmission, so as not to violate the memory protocol).

Figure 5:
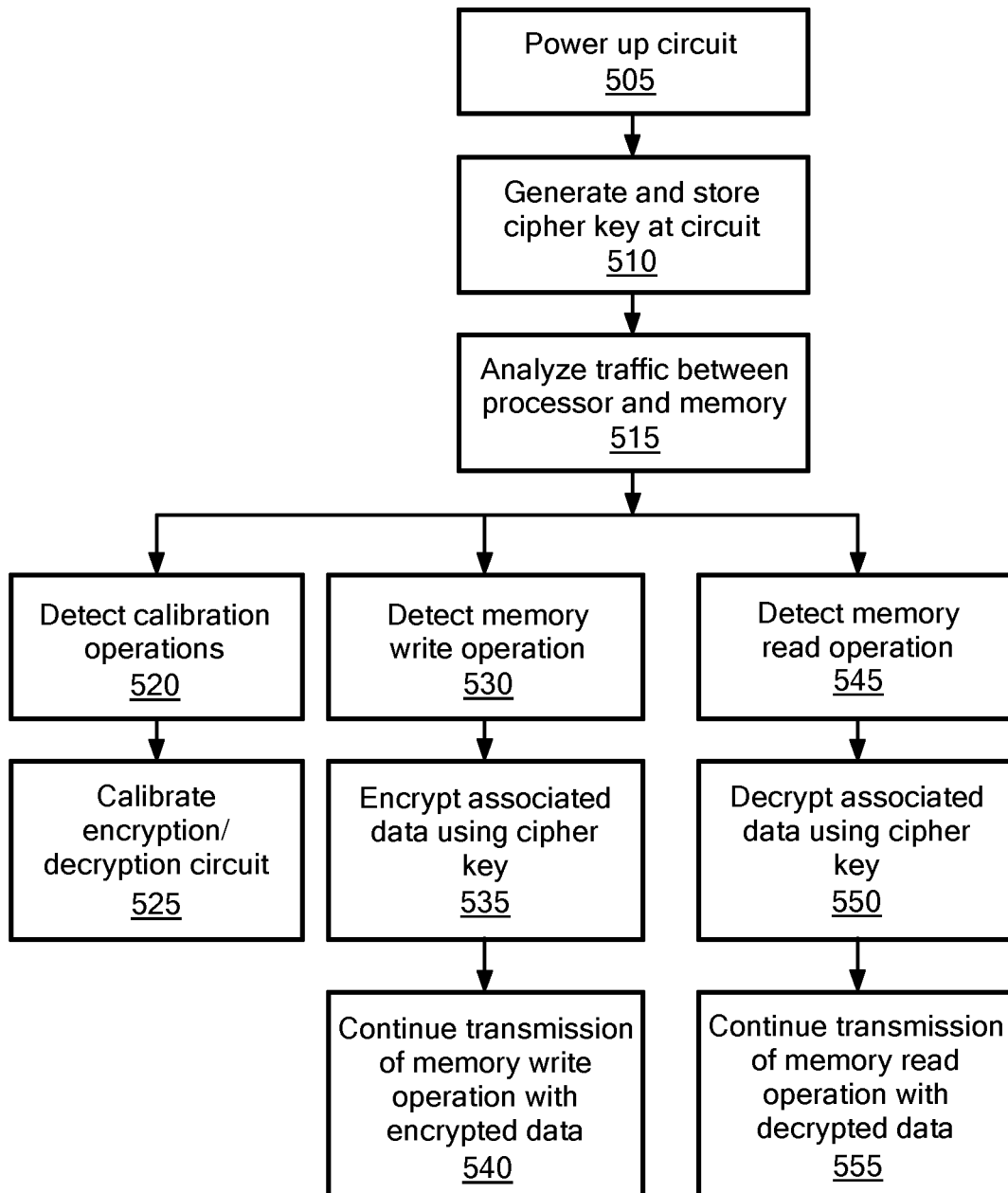
FIG. 5 illustrates an example method for encrypting/decrypting data in accordance with an embodiment of the present invention.

FIG. 5 illustrates an example method for encrypting/decrypting data in accordance with an embodiment of the present invention. The example method is executed by an encryption/decryption circuit, such as described in connection with FIGS. 2-3, situated between the processor and the memory and operatively coupled the processor and memory via a set of buses. At step 505, the circuit is powered up, and at step 510, the method generates and stores a cipher key at the circuit. The cipher key may be generated using a random number technique. At step 515, the method analyzes traffic between the processor and memory. For example, one of the set of buses may be a command and address bus, and the method analyzes the traffic to detect operations (or commands) between the processor and memory. At step 520, the method detects a calibration operation, such as the mode register set (MRS) operation or ZQCS/ZQXL operation. At step 525, based on this detected operation, the method calibrates the circuit in accordance with the information associated with this operation. In some embodiments, the calibration includes adding and calibrating delays components in the circuit, calibrating precise logic flow of data between the circuit components, and such. For example, if the information indicates that write leveling is enabled, which compensates the data strobe to the clock skew, the method may asserts the DQ_DIR 377 and DQS_DIR 378 to calibrate the encryption/decryption XOR logic of the circuit accordingly.

At step 530, the method detects a memory write operation. In some embodiments, the memory write operation is associated with a set of commands, including an ACT command, a Write command, and a Pre-charge command. Based on the ACT command, the method may move counters corresponding to the cache lines being read/written from global memory (containing all cache lines of the memory) to faster access memory. Based on the Read/Write command, the method may create a cipher stream based on the cipher key generated at power up and the cache lines retrieved from the faster access memory. Based on the Pre-charge command, the method may evict the counters back to the slower global memory.

At step 535, the method encrypts the associated data using the cipher key. In some embodiments, the method encrypts the associated data using the cipher key combined with a counter for the cache line in memory to which the data is being written. In some embodiments, one of the set of buses may be a data bus between the processor and memory, and the method encrypts the data on the data bus associated with the memory write operation. In the embodiments in which the write operation is associated with a set of commands, the method performs the encryption in response to the Write command, after preparing for the encryption in response to the ACT command. In embodiments, the method performs the encryption without adding latency to data transmission speed between the processor and memory. For example, the method may utilize the faster access memory to generate the cipher stream, calibrated delays components in the circuit, and calibrated precise logic flow of data between the circuit components, such that the encryption can be performed without adding such latency. At step 540, the method continues transmission (e.g., on the DQ/DQS bus) of the encrypted data to the memory.

At step 545, the method detects a memory read operation. In some embodiments, the memory read operation is associated with a set of commands, including the ACT command, the Read command, and the Pre-charge command. At step 550, the method decrypts the associated data using the cipher key. In some embodiments, the method decrypts the associated data using the cipher key combined with a counter for the cache line in memory to which the data is being read. In some embodiments, one of the set of buses may be a data bus between the processor and memory, and the method decrypts the data, on the data bus, associated with the memory read operation. In the embodiments in which the read operation is associated with a set of commands, the method performs the decryption in response to the Read command, after preparing for the decryption in response to the ACT command. In embodiments, the method performs the decryption without adding latency to data transmission speed between the processor and memory. For example, the method may utilize the faster access memory to generate the cipher stream, calibrated delays components in the circuit, and calibrated precise logic flow of data between the circuit components, such that the decryption can be performed without adding such latency. At step 555, the method continues transmission (e.g., on the DQ/DQS bus) of the decrypted data to the processor.

Figure 6:
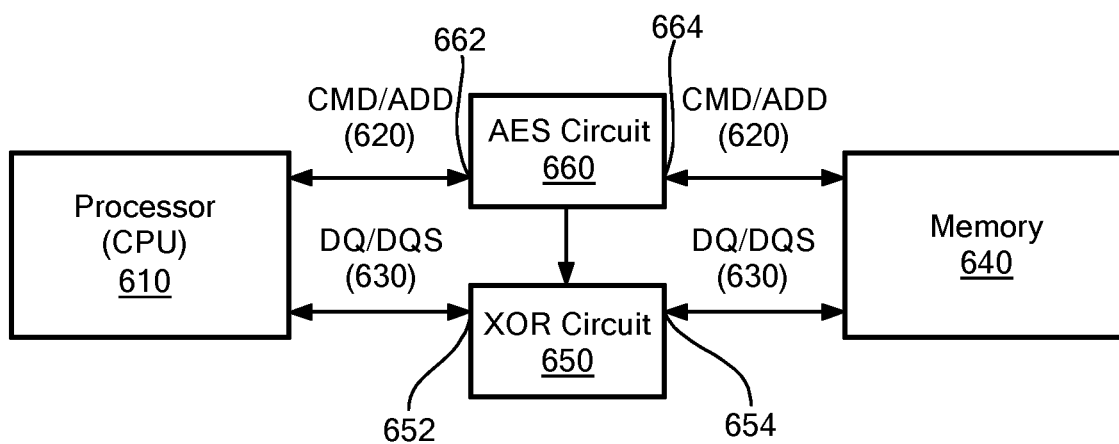
FIG. 6 illustrates a computer system for performing exclusive-or (XOR) operations on data transmitted between a processor and memory in accordance with an embodiment of the present invention.

FIG. 6 illustrates a computer system for performing exclusive-or (XOR) operations on data transmitted between a processor and memory in accordance with an embodiment of the present invention.

The embodiment of FIG. 6 includes a modification to the common interface between a processor and memory shown in FIG. 1. The embodiment of FIG. 6 may be used to perform operations (e.g., encryption, decryption, etc.) on data as it passes between the processor 210 and memory 240, without intervention by the processor 210. In particular, the computer system of FIG. 6 is configured with an XOR circuit 650 and an AES controller (AES) circuit 660 that are positioned between the processor 210 and the memory 240. The AES circuit 660 includes an interface 652 that receives the command signals and associated memory addresses transmitted on the CMD/ADD bus 620 by the processor 610, and an interface 654 that forwards those command signals and associated memory addresses on the CMD/ADD bus 620 to the memory 640.

The XOR circuit 650 includes an interface 652 that: (i) receives the data and data strobe signals transmitted on the DQ/DQS bus 630 from the processor 610, and (ii) transmits the circuit modified (e.g., decrypted) data and data strobe signals on the DQ/DQS bus 630 to the processor 610. The interface 652 emulates the memory protocol by being configured with logic that mimics the logic of the memory 640, such that processor 610 can interface with the XOR circuit 650 using the memory protocol. For example, the interface 652 may be configured to mimic the electrical characteristics of the memory 640. The XOR circuit 650 also includes interface 654 that: (i) receives the data and data strobe signals transmitted on the DQ/DQS bus 630 from the memory 640, and (ii) transmits the circuit modified (e.g., encrypted) data and data strobe signals on the DQ/DQS bus 630 to the memory 640. The interface 654 emulates the processor protocol by being configured with logic that mimics the logic of the processor 610, such that the memory 640 can interface with the XOR circuit 650 using the processor protocol. For example, the interface 654 may be configured to mimic the electrical characteristics of the processor 610.

The logic of the XOR circuit 650 is configured to provide a bi-directional path for operating on the data transmitted on the DQ/DQS bus 630. That is, the logic of the XOR circuit 650 provides a first path direction, which receives data on the interface 652 from the processor 610, performs an operation (e.g., encryption) on the data, and forwards the resulting data (e.g., encrypted data) out the interface 654 to the memory 640. The logic of the XOR circuit 650 also provides a second path direction, which receives data on the interface 654 from the memory 640, performs an operation (e.g., decryption) on the data, and forwards the resulting data (e.g., decrypted plaintext data) out the interface 652 to the processor 610. In embodiments, the XOR circuit XORs the input DQ data with cipher stream data to generate encrypted data (cipher text) or decrypted data (plaintext).

Figure 7A:
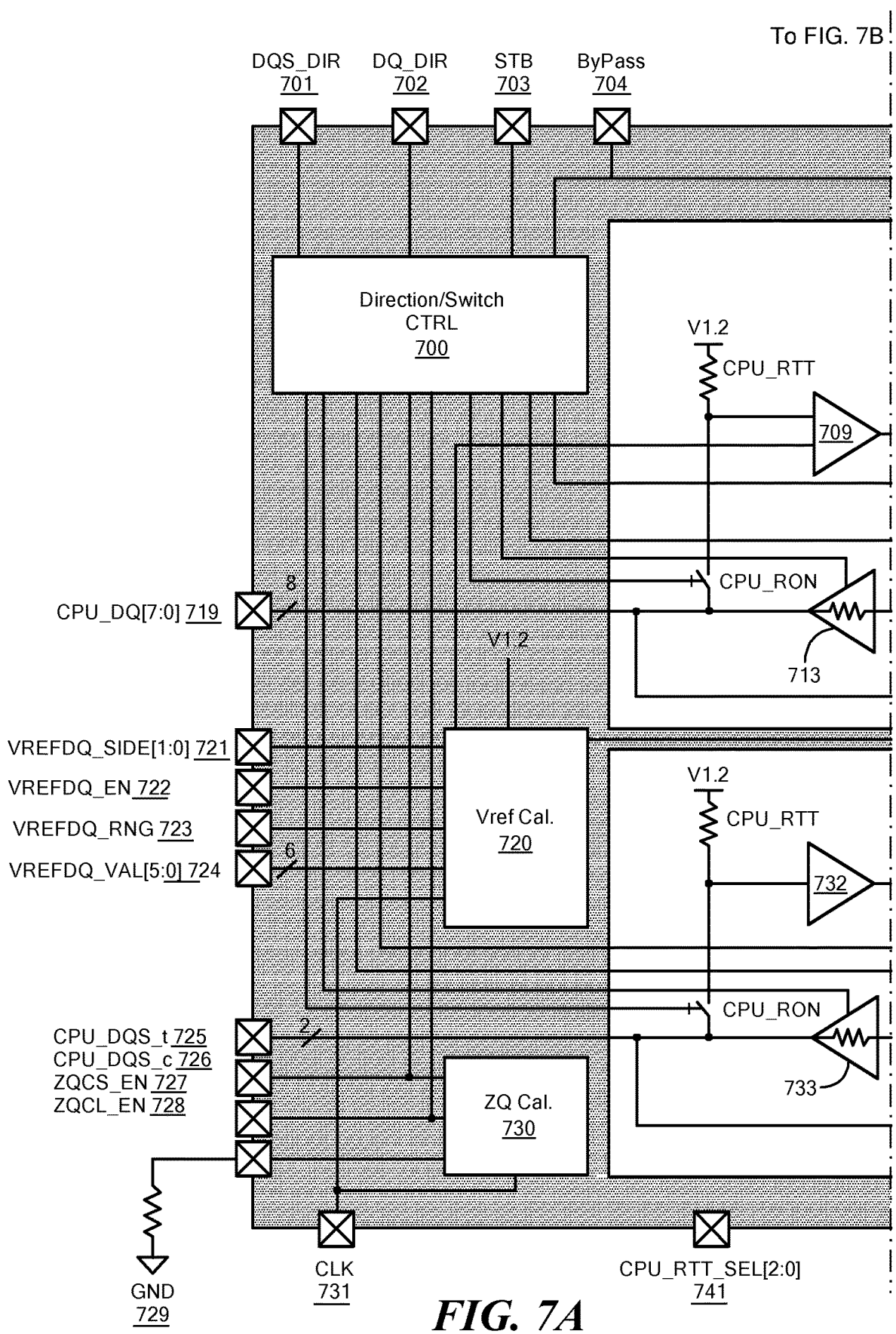
FIGS. 7A and 7B (collectively FIG. 7) illustrate an example embodiment of the XOR circuit in FIG. 6.
Figure 7B:
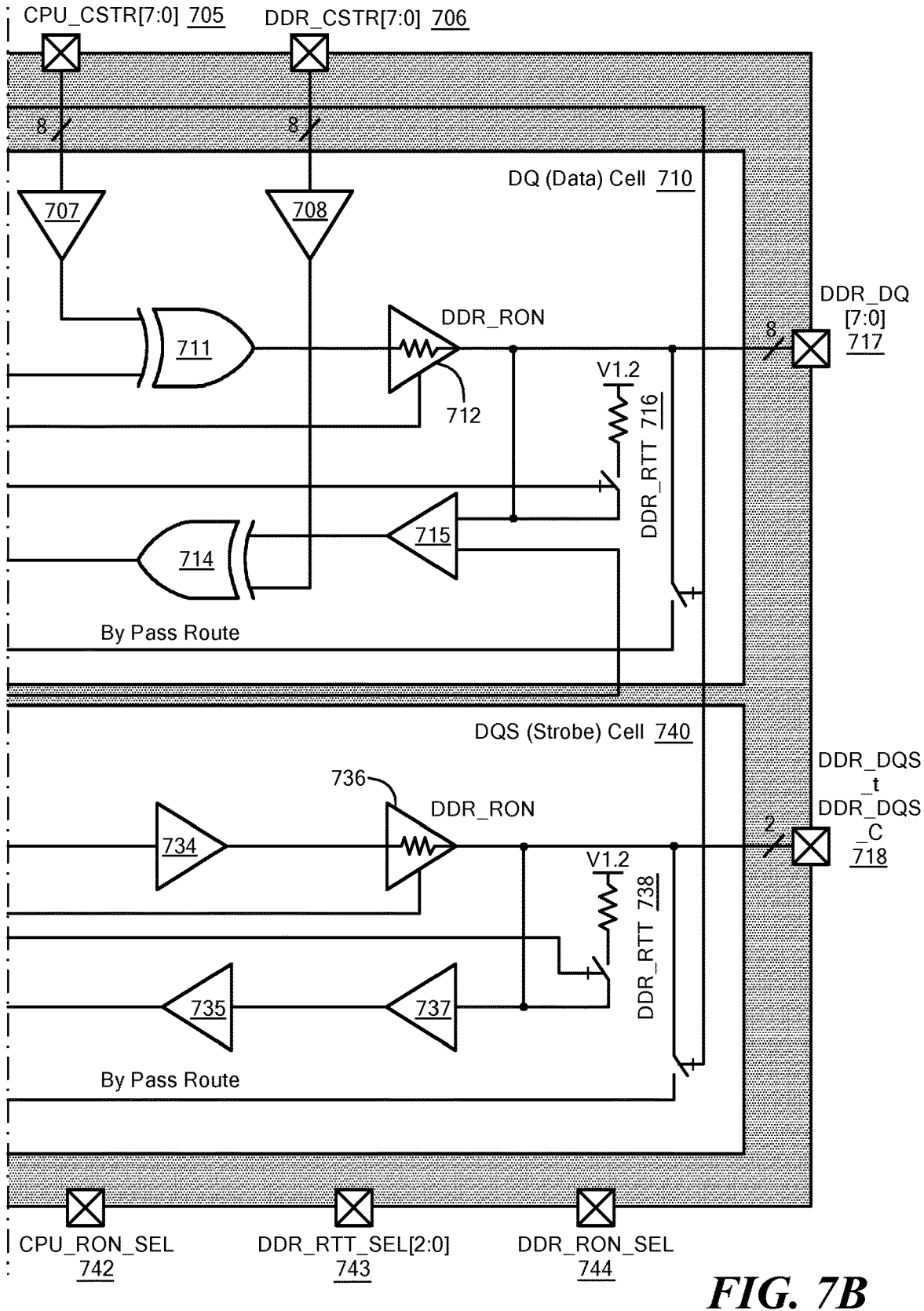

FIG. 7 illustrates an example embodiment of the XOR circuit in FIG. 6. In some embodiments, the XOR circuit of FIG. 7 is an application-specific integrated circuit (ASIC). The XOR circuit of FIG. 6 may be used as the XOR logic module 380 f FIG. 3.

The XOR circuit may include five primary modules as shown in the block diagram of FIG. 7. These modules are the DQ Cell module 710, the DQS (Strobe) Cell module 740, the Vref Calibration module 720, the ZQ Calibration module 730, and the Direction/Switch Control module 700.

The DQ Cell module 710 includes logic that configures a bi-directional path for processing received data. The first direction of the path processes DQ data (CPU_DQ[7:0]) 719 received from the processor 610, and includes logic 709, 711, and 712. In the first direction, the XOR circuit includes buffer logic 709 configured to mimic the logic of the memory 640, such as the electrical characteristics of the memory 640. For example, the input to logic 709 includes contributions of calibrated processor ODT (CPU_RTT) and calibrated reference voltage (from the Vref Calibration module 720), which enables the logic 709 to mimic such electrical characteristics. The use of logic 709 makes the processor unaware that it is not interfacing directly with the memory.

The output of logic 708 is input into XOR gate logic 711 together with a cipher stream (CPU_CSTR[7:0]) 705 generated for the processor. The cipher stream 705 is input to the XOR gate logic 711 via buffer logic 707. In the embodiment of FIG. 7, the circuit includes separate cipher stream for the processor 610 and the memory 640, but in other embodiments a single cipher stream may be used for both the processor 610 and the memory 640. In some embodiments, the cipher stream as generated, as described in connection with FIG. 3, based on a random cipher key and a cache line counter. The encrypted data output from the XOR gate logic 711 is then input into the buffer logic 712, together contributions of direction input from the Direction/Switch CTRL 700 and calibrated output driver (DDR_RTT). The output from the buffer logic 712 is transmitted as the DQ data to the memory 640. In embodiments, configuration of the buffer logic 709, 712, and 707 causes the circuit to process (e.g., encrypt) data without adding latency to the data transmission speed, such that the processing does not violate the memory protocol.

Similarly, the DQ Cell module 710 includes a second path direction. The second direction processes DQ data (DDR_DQ[7:0]) 717 received from the memory 640, and includes logic 713, 714, 715. The buffer logic 715 is configured to mimic the logic of the processor 610, such as the electrical characteristics of the processor. For example, the input to logic 715 includes contributions from calibrated memory ODT (DDR_RTT) and calibrated reference voltage (from the Vref Calibration module 720), which enables the logic 715 to mimic such electrical characteristics. The use of logic 715 makes the memory unaware that it is not interfacing directly with the processor 610.

The output of logic 715 is input into XOR gate logic 714, together with a cipher stream (DDR_CSTR[7:0]) 706 generated for the memory. The cipher stream 706 is input to the memory via buffer logic 708. The decrypted data output from the XOR gate logic 714 is then input into the buffer logic 713, together with contributions of direction input from the Direction/Switch CTRL 700 and calibrated output driver (DDR_RTT). The output from the buffer logic 713 is transmitted as the DQ data to the processor 610. The DQ Cell module 710 also includes a By Pass Route for the DQ data received from the processor 610 or memory 640. In embodiments, configuration of the buffer logic 713, 715, and 708 causes the circuit to process (e.g., decrypt) data without adding latency to the data transmission speed, such that the processing does not violate the memory protocol.

The DQS Cell module 740 includes logic that configures a bi-directional path for processing received data strobe. The first direction of the path processes the DQS data strobe (CPU_DQS_t[7:0]) 725 received from the processor 610, and includes buffer logic 732, 734, and 736. This logic allows keeping the DQS data strobe in synchronization with the corresponding DQ data received from the processor 610. For example, the input to logic 709 includes contributions of the same ODT (CPU_RTT) and output driver (DDR_RON) structure as used in the first direction of the DQS (Data) Cell 710. The second direction of the path processes the DQS data strobe (DDR_DQS_t[7:0]) 718 received from the memory 640, and includes buffer logic 733, 735, and 737. This buffer logic allows keeping the DQS data strobe in synchronization with the corresponding DQ data received from the memory 640 (by matching clock time delays in processing the data). For example, the input to logic 709 includes contributions of the same calibrated ODT (DDR_RTT) and output driver (CPU_RON) structure as used in the second direction of the DQS (Data) Cell 710. The DQS Cell module 740 also includes a By Pass Route.

Parameter values of the CPU_RTT, CPU_RON, DDR_RTT, and DDR_RON may be selected using the CPU_RTT_SEL[2:0] 741, CPU_RON_SEL 742, DDR_RTT_SEL[2:0] 743, and DDR_RON_SEL 744, respectively.

The Vref Calibration module 720 calibrates the reference clock voltage for the circuit in accordance with DQ data communications between the processor 610 and memory 640 The Vref Calibration module 720 receives as inputs: VREFDQ_SIDE[1:0} 719, VREFDQ_EN 722, VREFDQ_RNG 723, and VREFDQ_VAL[5:0]. The ZQ Calibration module 730 calibrates each ODT resistor (CPU_RTT and DDR_RTT) and output driver $R_{ON}$ (CPU_RON and DDR_RON) for the DQ and DQS inputs to the corresponding external precision resistor of the processor 610 or memory 640. The ZQ Calibration module 730 receives the following signals: CPU_DQS_t 725, CPU_DQS_c 726, ZQCS_EN 727, and ZQCL_EN 728, along with input from the Direction/Switch Control module 700 and Vref Calibration module 720.

The Direction/Switch Control module 700 controls the direction and switches of the circuit in accordance with communications between the processor 610 and memory 640. It receives the following signals to control the execution of the XOR circuit: DQS_DIR 701, DQ_DIR 702, ZQCL_EN 728, ZQCS_EN 727, standby mode (STB) 703, and ByPass 704 that turns On/Off ODT, turns On/Off RON, sets both DQ and DQS side to Hi Z, or bypasses (shorts) processor to memory. In embodiments, a controller, such as AES 660 of FIG. 6, operatively coupled to the XOR circuit may determine the setting of these signals based on commands transmitted from the processor 610 to memory 640.

Figure 8:
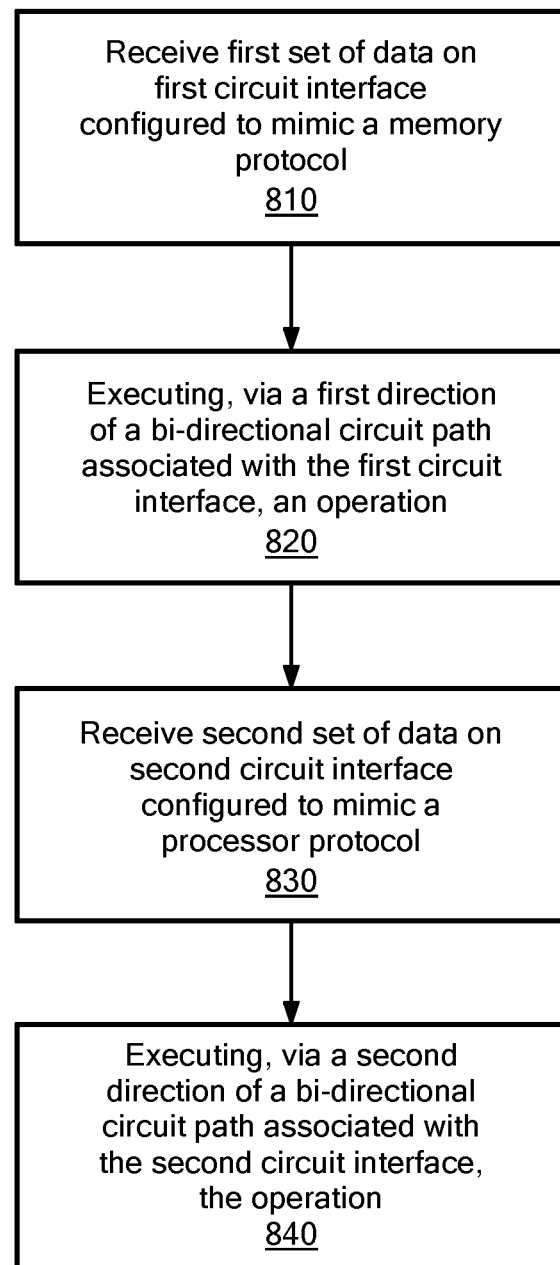
FIG. 8 illustrates an example method for XORing data in accordance with an embodiment of the present invention.

FIG. 8 illustrates an example method for XOR'ing data in accordance with an embodiment of the present invention. In the embodiment of FIG. 8, the method may be executed by an XOR circuit, such as shown in FIG. 7. The XOR circuit of FIG. 8 has logic that configures a bi-directional path for processing (e.g., encrypting and/or decrypting) received data. At step 810, the method receives a first set of data on a first interface of the XOR circuit, where the first interface is configured to mimic a memory protocol (e.g., DDR 1 protocol, DDR 2 protocol, DDR 3 protocol, DDR 4 protocol, etc.). For example, the first interface may be configured to mimic the electrical characteristics, timing characteristics, etc. of the memory protocol. For another example, the data may be a DQ signal received from the processor on a DQ/DQS bus, which is transmitted in accordance with the memory protocol. The first interface is associated with a first direction of the bi-directional path of the circuit. At step 820, the method executes, via the first direction of the bi-directional path, an operation (e.g., an encryption operation) on the data, and forwards the modified (e.g., encrypted data) via a second interface. In embodiments, the method performs the operation, without adding latency to the data transmission speed between the processor and memory, thereby avoid violation of the memory protocol. For example, the XOR circuit is configured to execute the operation within a given clock time (e.g., ½ clock cycle) to prevent adding such latency. In some embodiments, avoiding adding latency to the transmission speed is achieved in the system when neither (i) clock speed is reduced, nor (ii) additional clocks are added.

At step 830, the method receives a second set of data on a second interface of the XOR circuit, where the second interface is configured to mimic a processor protocol (e.g., Intel Xeon protocol, etc.). For example, the second interface may be configured to mimic the electrical characteristics, timing characteristics, etc. of the processor protocol. For another example, the data may be a DQ signal received from the memory on a DQ/DQS bus, which is transmitted in accordance with the processor protocol. The second interface is associated with a second direction of the bi-directional path of the circuit. At step 840, the method executes, via the second direction of the bi-directional path, an operation (e.g., decryption operation) on the data, and forwards the modified (e.g., decrypted plaintext data) to the processor via the first interface. In embodiments, the method performs the operation, without adding latency to the data transmission speed between the processor and memory, thereby avoid violation of the processor protocol. For example, the XOR circuit is configured to execute the operation within a given clock time (e.g., ½ clock cycle) to prevent adding such latency.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the clams below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer system for performing operations on data transmitted between a processor and memory, the system comprising:
   the processor;
   the memory configured to store data associated with the processor; and
   an XOR circuit having a first interface configured to emulate a first protocol of the memory and a second interface configured to emulate a second protocol of the processor, the XOR circuit having a bi-directional path, such that each of the first interface and the second interface is associated with a different direction of the bi-directional path, the bi-directional path configured to execute an operation on data received at both the first interface and the second interface,
   wherein one direction of the bi-directional path has logic configured to:
      receive, at the first interface, data transmitted from the processor to the memory according to the first protocol of the memory;
      execute the operation on the data; and
      transmit the data, in the first protocol, to the memory.

2. The system according to claim 1, wherein the operation encrypts the data by performing an XOR of the data with a cipher stream.

3. The system according to claim 1, wherein one direction of the bi-directional path has logic configured to:
   receive, at the second interface, data transmitted from the memory to the processor, the data formed according to the second protocol of the processor;
   execute the operation on the data; and
   transmit the data, in the second protocol, to the processor.

4. The system according to claim 3, wherein the operation is decryption of the data by performing an XOR of the data with a cipher stream.

5. The system according to claim 1, wherein the memory is associated with a data transmission speed, and the XOR circuit executes the operation on the data transmitted in either direction of the bi-directional path, without adding latency to the data transmission speed of the memory.

6. The system according to claim 5, wherein the XOR circuit is configured to execute the operation on the data within a given clock time that enables the XOR circuit to transmit the data without adding latency to the data transmission speed.

7. The system according to claim 6, wherein the memory is a double data rate 4 (DDR4) DRAM with a high bandwidth DDR4 interface, and the XOR circuit is configured to execute the operation on the data within the given clock time, such that the XOR circuit transmits the data at the data transmission speed of the DDR4 interface.

8. The system according to claim 6, wherein transmitting the data without adding latency to the data transmission speed is achieved when in the system neither (i) clock speed is reduced, nor (ii) additional clocks are added.

9. A hardware circuit for performing operations on data transmitted between a processor and memory, the hardware circuit comprising:
   a first interface communicatively coupled to the processor, the first interface configured to emulate a first protocol of the memory;
   a second interface communicatively coupled to the memory, the second interface configured to emulates a second protocol of the processor; and
   hardware logic configured with a bi-directional path, such that each of the first and second interfaces is associated with a different direction of the bi-directional path, the bi-directional path configured to execute an operation on data received at both the first interface and the second interface,
   wherein in one direction of the bi-directional path, the hardware logic is configured to:
      receive, at the first interface, data transmitted from the processor to the memory according to the first protocol of the memory;
      execute the operation on the data; and
      transmit the data, in the first protocol, to the memory.

10. The hardware circuit according to claim 9, wherein the operation encrypts the data by performing an XOR of the data with a cipher stream.

11. The hardware circuit according to claim 9, wherein in one direction of the bi-directional path, the hardware logic is configured to:
   receive, at the second interface, data transmitted from the memory to the processor, the data formed according to the second protocol of the processor;
   execute the operation on the data; and
   transmit the data, in the second protocol, to the processor.

12. The hardware circuit according to claim 11, wherein the operation decrypts the data by performing an XOR of the data with a cipher stream.

13. The hardware circuit according to claim 9, wherein the memory is associated with a data transmission speed, and the hardware logic executes the operation on the data transmitted in either direction of the bi-directional path, without adding latency to the data transmission speed of the memory.

14. The hardware circuit according to claim 13, wherein the hardware logic is configured to execute the operation on the data within a given clock time that enables the XOR circuit to transmit the data without adding latency to the data transmission speed.

15. The hardware circuit according to claim 14, wherein the memory is a double data rate 4 (DDR4) DRAM with a high bandwidth DDR4 interface, and the XOR circuit is configured to execute the operation on the data within the given clock time, such that the XOR circuit transmits the data at the data transmission speed of the DDR4 interface.

16. The hardware circuit according to claim 13, wherein transmitting the data without adding latency to the data transmission speed is achieved when neither (i) clock speed is reduced, nor (ii) additional clocks are added.

17. A computer-implemented method of performing operations on data transmitted between a processor and memory, the method comprising:
receiving a first set of data at a first interface of a XOR circuit, the first interface configured to emulate a first protocol of a memory;
receiving a second set of data at a second interface of the XOR circuit, the second interface configured to emulate a second protocol of the processor; and
executing, by hardware logic having a bi-directional path, an operation on the first set of data and the second set of data, wherein each of the first interface and the second interface is associated with a different direction of the bi-directional path,
wherein one direction of the bi-directional path has hardware logic configured to:
receive, at the first interface, data transmitted from the processor to the memory according to the first protocol of the memory;
execute the operation on the data; and
transmit the data, in the first protocol, to the memory.

18. The method according to claim 17, wherein the memory is associated with a data transmission speed, and the operation is executed by the hardware logic in the different directions of the bi-directional path, without adding latency to the data transmission speed of the memory.

19. The method according to claim 17, wherein the memory is associated with a data transmission speed, and the operation is executed by the hardware logic in the different directions of the bi-directional path, without adding latency to the data transmission speed of the memory.

20. A computer system for performing operations on data transmitted between a processor and memory, the system comprising:
the processor;
the memory configured to store data associated with the processor; and
an XOR circuit having a first interface configured to emulate a first protocol of the memory and a second interface configured to emulate a second protocol of the processor, the XOR circuit having a bi-directional path, such that each of the first interface and the second interface is associated with a different direction of the bi-directional path, the bi-directional path configured to execute an operation on data received at both the first interface and the second interface,
wherein one direction of the bi-directional path has logic configured to:
receive, at the second interface, data transmitted from the memory to the processor, the data formed according to the second protocol of the processor;
execute the operation on the data; and
transmit the data, in the second protocol, to the processor.

21. The system according to claim 20, wherein the operation is decryption of the data by performing an XOR of the data with a cipher stream.

22. The system according to claim 20, wherein the memory is associated with a data transmission speed, and the XOR circuit executes the operation on the data transmitted in either direction of the bi-directional path, without adding latency to the data transmission speed of the memory.

23. The system according to claim 22, wherein the XOR circuit is configured to execute the operation on the data within a given clock time that enables the XOR circuit to transmit the data without adding latency to the data transmission speed.

24. The system according to claim 23, wherein the memory is a double data rate 4 (DDR4) DRAM with a high bandwidth DDR4 interface, and the XOR circuit is configured to execute the operation on the data within the given clock time, such that the XOR circuit transmits the data at the data transmission speed of the DDR4 interface.

25. The system according to claim 23, wherein transmitting the data without adding latency to the data transmission speed is achieved when in the system neither (i) clock speed is reduced, nor (ii) additional clocks are added.

26. A hardware circuit for performing operations on data transmitted between a processor and memory, the hardware circuit comprising:
a first interface communicatively coupled to the processor, the first interface configured to emulate a first protocol of the memory;
a second interface communicatively coupled to the memory, the second interface configured to emulates a second protocol of the processor; and
hardware logic configured with a bi-directional path, such that each of the first and second interfaces is associated with a different direction of the bi-directional path, the bi-directional path configured to execute an operation on data received at both the first interface and the second interface,
wherein in one direction of the bi-directional path, the hardware logic is configured to:
receive, at the second interface, data transmitted from the memory to the processor, the data formed according to the second protocol of the processor;
execute the operation on the data; and
transmit the data, in the second protocol, to the processor.

27. The hardware circuit according to claim 26, wherein the operation decrypts the data by performing an XOR of the data with a cipher stream.

28. The hardware circuit according to claim 26, wherein the memory is associated with a data transmission speed, and the hardware logic executes the operation on the data transmitted in either direction of the bi-directional path, without adding latency to the data transmission speed of the memory.

29. The hardware circuit according to claim 28, wherein the hardware logic is configured to execute the operation on the data within a given clock time that enables the XOR circuit to transmit the data without adding latency to the data transmission speed.

30. The hardware circuit according to claim 29, wherein the memory is a double data rate 4 (DDR4) DRAM with a high bandwidth DDR4 interface, and the XOR circuit is configured to execute the operation on the data within the given clock time, such that the XOR circuit transmits the data at the data transmission speed of the DDR4 interface.

31. The hardware circuit according to claim 28, wherein transmitting the data without adding latency to the data transmission speed is achieved when neither (i) clock speed is reduced, nor (ii) additional clocks are added.

32. A computer-implemented method of performing operations on data transmitted between a processor and memory, the method comprising:
receiving a first set of data at a first interface of a XOR circuit, the first interface configured to emulate a first protocol of a memory;
receiving a second set of data at a second interface of the XOR circuit, the second interface configured to emulate a second protocol of the processor; and
executing, by hardware logic having a bi-directional path, an operation on the first set of data and the second set of data, wherein each of the first interface and the second interface is associated with a different direction of the bi-directional path,
wherein in one direction of the bi-directional path, the hardware logic is configured to:
receive, at the second interface, data transmitted from the memory to the processor, the data formed according to the second protocol of the processor;
execute the operation on the data; and
transmit the data, in the second protocol, to the processor.

33. A computer system for performing operations on data transmitted between a processor and memory, the system comprising:
the processor;
the memory configured to store data associated with the processor; and
an XOR circuit having a first interface configured to emulate a first protocol of the memory and a second interface configured to emulate a second protocol of the processor, the XOR circuit having a bi-directional path, such that each of the first interface and the second interface is associated with a different direction of the bi-directional path, the bi-directional path configured to execute an operation on data received at both the first interface and the second interface,
wherein the memory is associated with a data transmission speed, and the XOR circuit executes the operation on the data transmitted in either direction of the bi-directional path, within a given clock time and without adding latency to the data transmission speed of the memory, and
wherein the memory is a double data rate 4 (DDR4) DRAM with a high bandwidth DDR4 interface, and the XOR circuit is configured to execute the operation on the data within the given clock time, such that the XOR circuit transmits the data at the data transmission speed of the DDR4 interface.

34. The system according to claim 33, wherein one direction of the bi-directional path has logic configured to:
receive, at the first interface, data transmitted from the processor to the memory according to the first protocol of the memory;
execute the operation on the data; and
transmit the data, in the first protocol, to the memory.

35. The system according to claim 34, wherein the operation encrypts the data by performing an XOR of the data with a cipher stream.

36. The system according to claim 33, wherein one direction of the bi-directional path has logic configured to:
receive, at the second interface, data transmitted from the memory to the processor, the data formed according to the second protocol of the processor;
execute the operation on the data; and
transmit the data, in the second protocol, to the processor.

37. The system according to claim 36, wherein the operation is decryption of the data by performing an XOR of the data with a cipher stream.

38. The system according to claim 33, wherein transmitting the data without adding latency to the data transmission speed is achieved when in the system neither (i) clock speed is reduced, nor (ii) additional clocks are added.

39. A hardware circuit for performing operations on data transmitted between a processor and memory, the hardware circuit comprising:
a first interface communicatively coupled to the processor, the first interface configured to emulate a first protocol of the memory;
a second interface communicatively coupled to the memory, the second interface configured to emulates a second protocol of the processor; and
hardware logic configured with a bi-directional path, such that each of the first and second interfaces is associated with a different direction of the bi-directional path, the bi-directional path configured to execute an operation on data received at both the first interface and the second interface,
wherein the memory is associated with a data transmission speed, and the XOR circuit executes the operation on the data transmitted in either direction of the bi-directional path, within a given clock time and without adding latency to the data transmission speed of the memory, and
wherein the memory is a double data rate 4 (DDR4) DRAM with a high bandwidth DDR4 interface, and the XOR circuit is configured to execute the operation on the data within the given clock time, such that the XOR circuit transmits the data at the data transmission speed of the DDR4 interface.

40. The hardware circuit according to claim 39, wherein in one direction of the bi-directional path, the hardware logic is configured to:
receive, at the first interface, data transmitted from the processor to the memory according to the first protocol of the memory;
execute the operation on the data; and
transmit the data, in the first protocol, to the memory.

41. The hardware circuit according to claim 40, wherein the operation encrypts the data by performing an XOR of the data with a cipher stream.

42. The hardware circuit according to claim 39, wherein in one direction of the bi-directional path, the hardware logic is configured to:
receive, at the second interface, data transmitted from the memory to the processor, the data formed according to the second protocol of the processor;
execute the operation on the data; and transmit the data, in the second protocol, to the processor.

43. The hardware circuit according to claim 42, wherein the operation decrypts the data by performing an XOR of the data with a cipher stream.

44. The hardware circuit according to claim 39, wherein transmitting the data without adding latency to the data transmission speed is achieved when neither (i) clock speed is reduced, nor (ii) additional clocks are added.

45. A computer-implemented method of performing operations on data transmitted between a processor and memory, the method comprising:
  receiving a first set of data at a first interface of a XOR circuit, the first interface configured to emulate a first protocol of a memory;
  receiving a second set of data at a second interface of the XOR circuit, the second interface configured to emulate a second protocol of the processor; and
  executing, by hardware logic having a bi-directional path, an operation on the first set of data and the second set of data, wherein each of the first interface and the second interface is associated with a different direction of the bi-directional path,
  wherein the memory is associated with a data transmission speed, and the XOR circuit executes the operation on the data transmitted in either direction of the bi-directional path, within a given clock time and without adding latency to the data transmission speed of the memory, and
  wherein the memory is a double data rate 4 (DDR4) DRAM with a high bandwidth DDR4 interface, and the XOR circuit is configured to execute the operation on the data within the given clock time, such that the XOR circuit transmits the data at the data transmission speed of the DDR4 interface.

46. The method according to claim 45, wherein the memory is associated with a data transmission speed, and the operation is executed by the hardware logic in the different directions of the bi-directional path, without adding latency to the data transmission speed of the memory.

* * * * *